United States Patent [19]

Bergamaschi

[11] Patent Number: 4,571,797
[45] Date of Patent: Feb. 25, 1986

[54] MACHINE FOR MANUFACTURING FOLDING SHAVING RAZORS

[76] Inventor: Athos Bergamaschi, Via Della Resistenza 13, Trebbo Di Reno (Province of Bologna), Italy

[21] Appl. No.: 458,593

[22] Filed: Jan. 17, 1983

[30] Foreign Application Priority Data

Jan. 26, 1982 [IT] Italy ................... 3317 A/82

[51] Int. Cl.$^4$ ............................. B23P 23/04
[52] U.S. Cl. .................... 29/33 K; 29/33 P; 29/564.1; 29/818; 264/249; 264/339; 425/388; 76/DIG. 18
[58] Field of Search .............. 29/33 K, 33 P, 33 R, 29/33 Q, 564, 564.1, 818, 713; 425/383, 388, 405 R; 264/259, 249, 248, 339; 76/DIG. 8

[56] References Cited

U.S. PATENT DOCUMENTS 2,642,111  6/1953  Bindszus .................... 29/818
3,231,968  2/1966  Swanson .................... 29/713

FOREIGN PATENT DOCUMENTS 71576  6/1977  Japan .................... 29/33 K

Primary Examiner—Gil Weidenfeld
Assistant Examiner—Daniel W. Howell
Attorney, Agent, or Firm—Guido Modiano; Albert Josif

[57] ABSTRACT

The machine comprises a transport chain wherealong a plurality of brackets are distributed for supporting the razor square central areas, horizontal fixed upper and lower abutment profiles whereAlong the razors are caused to slide, a magazine for the razor blades packed in stacked relationship, below which a chest is mounted slidably which can be driven horizontally into a discharge position overlying the chain, a slider carried for vertical movement at the chest discharge position and adapted to be lowered onto the chest to pick up a blade therefrom by suction, and then to be further lowered, with the chest in its retracted position, and deposit the blade onto the blade holder strip of a razor, fixed contoured detents adapted to cause, as the brackets are being advanced, the blade covering strip to be bent around the tabs onto the blade holder strip, and a heater headpiece for securing the blade between the blade holder strip and blade covering strip.

5 Claims, 4 Drawing Figures

MACHINE FOR MANUFACTURING FOLDING SHAVING RAZORS

BACKGROUND OF THE INVENTION

This invention relates to a machine for manufacturing folding shaving razors.

The Applicant has developed a folding shaving razor which comprises a flattened foil-like element formed from a plastics-like material, which is affected by folding lines and can be manually brought into a configuration of minimized bulk for putting back and carrying around, wherein it takes the outward appearance of a match pad, and into an operative configuration wherein an elongate handle is defined at the end whereof are two cross strips between which a razor blade is clamped.

It has been found that manual manufacturing of such razors is uneconomical.

SUMMARY OF THE INVENTION

It is an object of this invention to provide an automatic machine which can speed up such a manufacturing step.

Another object of the invention is to provide an automatic machine which can also fold the razor down into a configuration of minimum bulk.

It is a further object of this invention to provide a machine which can deliver folding razors at a competitive cost over traditional razors.

An added object of this invention is to achieve the foregoing objects through a construction which is simple, comparatively easy to implement, safe to use, effective in operation, and affording a high hourly output at a comparatively economical cost.

According to one aspect of the present invention the above and other objects are achieved by a machine for manufacturing folding shaving razors including a flattened foil-like element formed from a plastics-like material, wherein folding lines define two substantially square areas wherebetween there intervene a center rib and an end rib which is a unitary construction and forms an obtuse angle with a rectangular blade holder strip whereto a rectangular blade covering strip is articulated through thin side tabs, said strips being assemblable together by inserting pegs made rigid with one strip into respective holes in the other strip and then deforming the peg ends, said machine being characterized in that it comprises a transport chain wherealong a plurality of brackets open on both sides are distributed to provide support for the square center areas of the razors; fixed horizontal, upper and lower, abutment profiles wherealong the razors are caused to slide and being operative to hold the component elements thereof in an open substantially horizontal configuration; a magazine for blades packed in stacked relationship wherebelow a chest is slidably accommodated which can be driven horizontally from a pick up position underlying the blade pack to a discharge position overlying said chain; a slider carried for vertical movement at said discharge position of the chest and being associated with suction and blowing means, said slider being adapted to be lowered onto said chest to pick up by suction a blade therefrom and to be then further lowered, with said chest in the withdrawn position, to deposit said blade onto the blade holder strip of a razor; fixed contoured detents effective to produce, as said brackets are being advanced, folding of said blade covering strip around said tabs onto said blade holder strip; a fastener assembly located successively to said fixed detents and including a heater headpiece supported for vertical movement and adapted to spread the free ends of said pegs apart for securing said blade between said blade holder strip and said blade covering strip.

BRIEF DESCRIPTION OF THE DRAWINGS

Further features will be more clearly understood from the following detailed description of a preferred, though not limitative, embodiment of a machine according to the invention, as illustrated by way of example and not of limitation in the accompanying drawings, where:

Figures 1, 2:
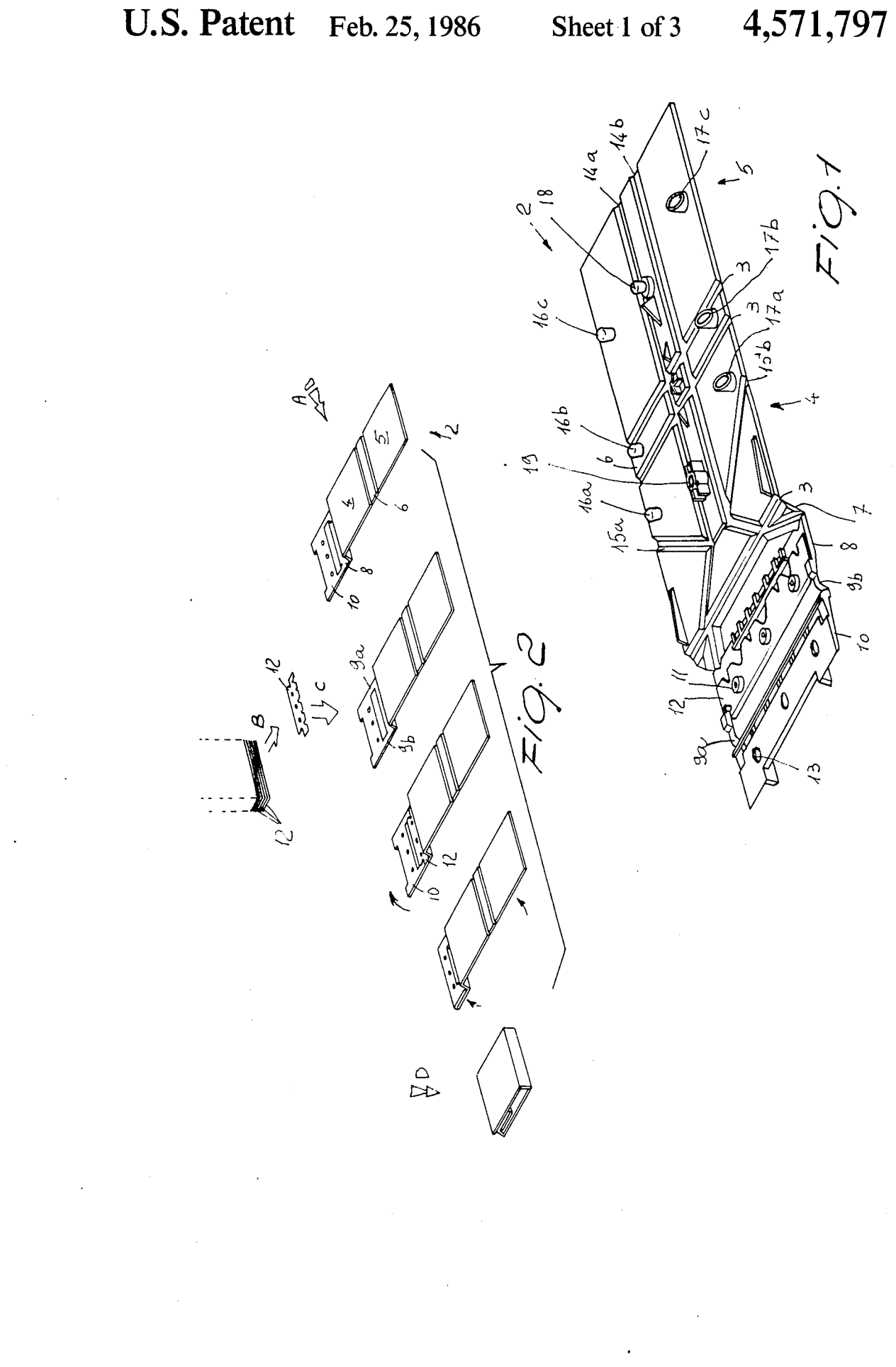

FIG. 1 is a perspective view of a folding razor in its fully opened configuration prior to securing the blade;

FIG. 2 is a perspective view of razors at successive steps of their manufacture;

DESCRIPTION OF THE PREFERRED EMBODIMENT

Figure 3:
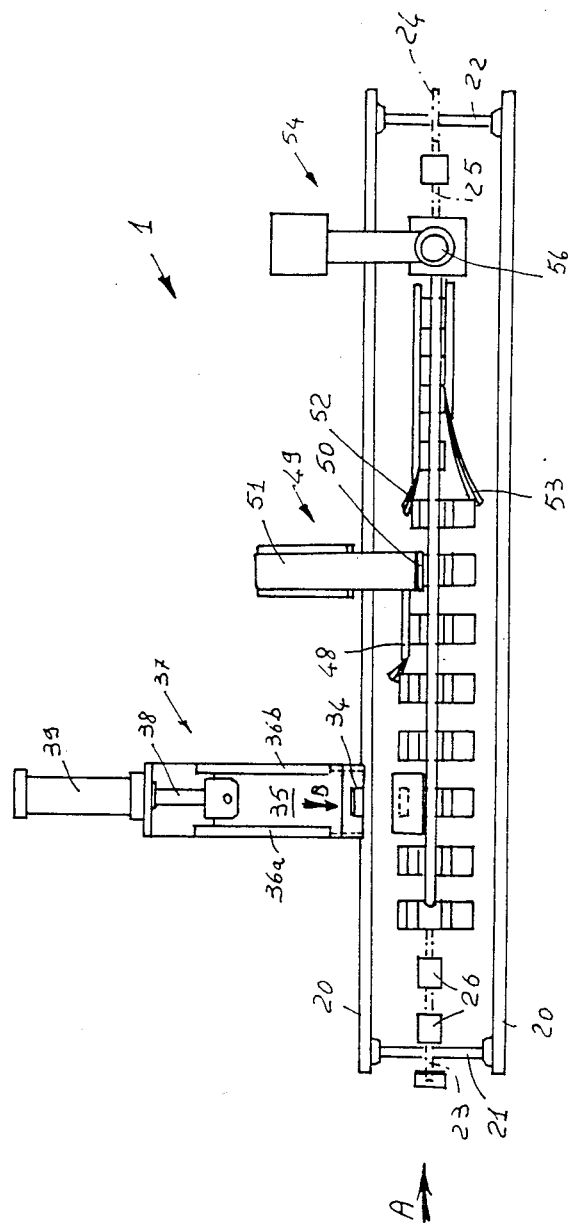
FIG. 3 is a schematical plan view of the machine for manufacturing folding shaving razors according to the invention.
Figure 4:
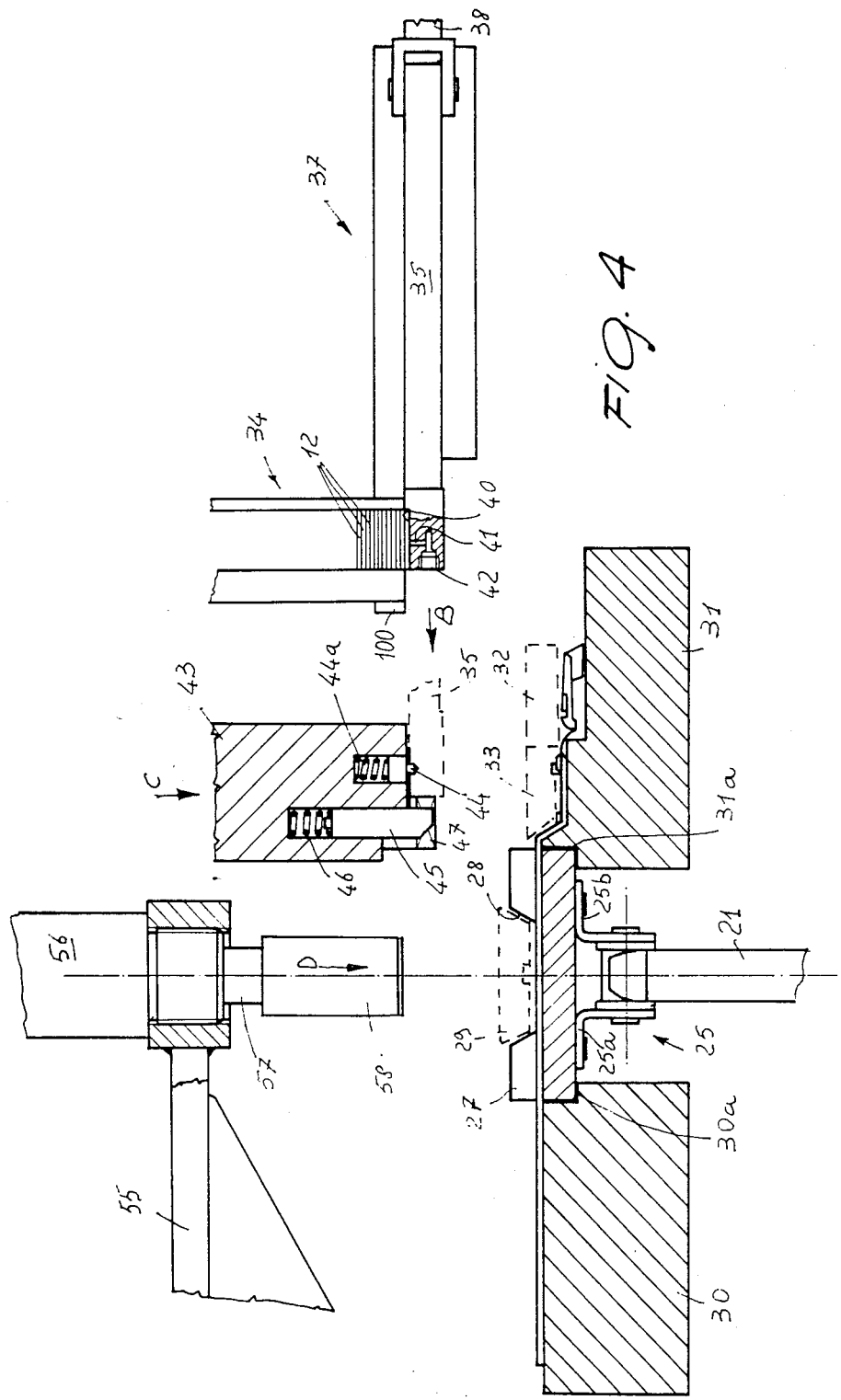
FIG. 4 is a partly sectional front view, taken to an enlarged scale through the machine of FIG. 3 along a vertical plane.

Making specific reference to the drawing figures, generally indicated at 1 is a machine according to the invention, for manufacturing folding shaving razors 2.

The razors 2 comprise a flattened foil-like or plate-like element made of a plastics-like material, wherein crosswise folding lines 3 define two substantially square areas or regions 4,5 having interposed therebetween a center rib 6 and an end rib 7 which is integral and forms an obtuse angle with a rectangular blade holder strip 8; articulated to the strip 8 by thin side tabs 9a,9b, is a blade covering rectangular strip 10; the strip 8 has three small hollow pegs 11 protruding therefrom cantilever fashion, onto which a blade 12 is centered which has corresponding holes; the pegs 11 are adapted to be inserted into corresponding holes 13 in the strips 10 and to be then deformed by heat application so as to lock the blade 12 between the strips 8 and 10; rotation of the various elements about the crosswise folding lines allows the razor to be reduced to its folded configuration.

The razor is also affected by two longitudinal middle folding lines 14a, 14b and St. Andrew's cross lines 15a, 15b formed at the end of the region 4; rotation of the various razor elements about the folding lines 14 and 15 results in the razor assuming its operative configuration and define a handle and a cutting headpiece extending orthogonally with and suitably inclined on the handle.

In order to hold the razor in a stable grasping configuration, provided on one side of the regions 4 and 5 and of the rib 6, are small pegs 16a, 16b, 16c, which are adapted to snap engage into corresponding bushings 17a, 17b, 17c provided on the other side of the regions 4 and 5 and of the rib 6; to instead hold the razor in its folded configuration, provided centrally on the region 5 is a small peg 18 which is adapted to engage in a corresponding bushing 19 at the middle of the region 4; in the folded configuration, the region 5 will be folded over the region 4, after the blade-strips assembly 8 and 10 has been folded to also secure the latter assembly.

Provided on the inner faces of the razor, moreover, are flanges and serrations adapted to ensure a correctly set angle between the parts with the razor in its operative configuration.

The machine 1 comprises a stationary frame 20, at the ends whereof are mounted two parallel and coplanar shafts 21, 22, which carry two respective sprocket wheels 23 and 24, around which is run a closed loop chain 25; the shaft 22 is driven by a gear motor unit, not shown in the drawing, which drives the upper run or active run of the chain in the direction of the arrow A.

Secured to the chain 25 by means of pairs of connecting plates 25a are a plurality of brackets 26, which are open laterally and whose front and rear walls 27 have respective middle notches 28 formed therein; the regions 4 of the razors are manually laid onto the brackets. Above the plane of advance of the razors, there is attached to the frame a fixed horizontal sectional member 29, while secured below said plane, are two horizontal side sectional members 30, 31, wherein two opposed steps 30a, 31a are formed for supporting the brackets 26 sideways; the sectional member 30 is substantially flat, whereas the sectional member 31 is contoured to match the outer contour of the razors with the strips 8 and 10 parallel to each other; at the area affected by the strips 10 and 8, above the sectional member 31, there are two sectional members 32 and 33; the cited sectional members have lead-in diverging bevels and curvatures facing the machine rear, and during the brackets forward movement, are adapted to hold the razors rigid with the brackets in an open configuration and with the various parts substantially horizontal.

Attached to the frame 2 at the top side of the transport chain is a magazine 34 for the blades 12 packed in stacked relationship; below the magazine 34, there is guided for a horizontal sliding movement in an orthogonal direction B to the arrow A a solid chest 35 which is carried between two side guides or rails 36a, 36b having a substantially C-like cross-sectional configuration with the opposed openings being secured to a holder structure 37 which has the magazine 34 rigid therewith; the chest is associated with the piston 38 of a fluid dynamic jack 39 attached to the structure 37; the jack 39 is advantageously of the pneumatic type.

At the front of the chest 35, there is a thin groove 40 having a depth substantially equal to the thickness of the blades and adapted, as the chest is advanced in the direction of the arrow B, to pull out the lowermost blade from the blade pack; advantageously, formed at the groove, are small holes 41 in communication with a coupling 42 which can be connected to a suction device effective to favor the separation of a blade to be picked up from the rest.

As the piston is driven in the direction of the arrow B, the chest is moved from a loading configuration wherein the groove 40 underlies the magazine 34 into an unloading configuration (shown in dash lines in the drawing), wherein the groove, and blade, overlie the path of the strips 8.

Above the unloading arrangement, there is guided for vertical sliding movement (arrow C) on the frame 20 a slider 43 which is driven by a pneumatic jack (the guiding means and jack are not shown in the drawing because substantially similar to the description provided with reference to the chest 35); mounted on the lower face of the slider 43, and acted upon by respective biasing compression springs 44a, are three small pegs or pins 44 which are adapted to penetrate the corresponding three holes in the blades, a small front wall 45 contoured at the bottom to match the inclination of the rib 7 and also biased by at least two compression springs 46, and two small side walls 47, also inclined laterally and spaced apart by a distance equal to the width of the strip 8; the lower face of the slider 43 is also formed with small throughgoing holes adapted for connection to a suction device and to a compressor.

The slider is adapted to move from a raised configuration into a configuration where it rests onto the groove 40 in the chest; in the latter configuration, the pegs 44 will center the blade holes, suction through the holes 41 is discontinued, and suction through the holes in the lower face of the slider is activated, thereby the blade is picked up by the slider; at this time, the chest will be returned to its loading configuration (in the opposite direction to the arrow B), and the slider is driven further down; the small wall 45 and small walls 47, in abutting against the razor, ensure its correct relative orientation and correct any small deviations therefrom, and the three small pegs 44, in centering themselves into the grooves on the pegs 11, also ensure correct centering of the blade onto the strip 4; upon lowering the slider, suction through the small holes in the slider lower face is discontinued and blowing is activated such that the blade can be deposited onto the strip 8.

Upon raising the slider, by moving it in the opposite direction to the arrow C, far enough to again locate it at a position overlying the chest path, the forward movement of the chain takes the strip 10 within the range of a fixed detent 48 having a substantially helix-like shape and being arranged after the end of the sectional member 32; the detent 48 is adapted to rotate the strip 10 through 180° about the tabs 9a, 9b, until the blade is clamped between the strip 8 and strip 10, with the pegs 11 inserted through the respective holes 13.

Successively to the detent 48, attached to the frame 20 is a fastening unit 49 which comprises a heater head 50, advantageously of the ultrasonic type, which is carried on a small arm 51, articulated rocker arm fashion about a parallel axis to the direction A and driven vertically by a jack; the heater headpiece is lowered as each razor moves past, and deforms the peg ends such as to rigidly and permanently secure the strips 8 and 10 together, with the blade clamped therebetween.

Successively to the unit 49, attached to the frame 20, on either sides of the chain, are two fixed detents 52, 53 having a substantially helix-like shape and being respectively adapted to produce, as the brackets are being advanced, the former, the folding of the strip 8 onto the region 4, and the latter, the folding of the region 5 onto the region 4; located at the proximities of the machine output end is a closure assembly 54 which comprises essentially an upper arm 55, on which is mounted an advantageously pneumatic cylinder 56 which has its vertical axis arranged substantially on the centerline of the chain and has, mounted under the piston 57, a pad 58 which, upon actuation of the jack 56, is adapted to move down (arrow D) and cause the peg 18 to penetrate the bushing 19 and lock the razor into the folded configuration.

At the chain end, the razors are definitely formed and closed in the folded configuration, ready for box packaging.

Advantageously, at the output end of the structure 37, there is a sensor 100 sensing the presence of the blade on the razors, which controls the heater headpiece of the fastening unit which only acts in the presence of a blade on the razor.

It should be noted that the machine of this invention is extremely fast and affords the production of folding razors at a comparable or even lower cost than traditional design razors.

Thus, the invention achieves its objects.

The invention so conceived is susceptible to many modifications and variations, without departing from the scope of the instant inventive concept.

Moreover, all of the details may be replaced with other technically equivalent ones.

In practicing the invention, the materials used, as well as the shapes and dimensions, may be any suitable ones meeting individual application requirements, without departing from the protective coverage of the appended claims.

I claim:

1. A machine for manufacturing folding shaving razors including a flattened plate-like element formed from a plastic-like material, wherein folding lines define two substantially square areas wherebetween there intervene a center rib and an end rib which is a unitary construction and forms an obtuse angle with a rectangular blade holder strip whereto a rectangular blade covering strip is articulated through thin side tabs, said strips being assemblable together by inserting pegs made rigid with one strip into respective holes in the other strip and then deforming one end of said pegs, wherein said machine comprises:

a stationary frame;

two parallel and coplanar shafts mounted at the ends of said frame;

two sprocket wheels respectively carried by said two parallel and complanar shafts;

a closed loop transport chain running around said two sprocket wheels;

connecting plates attached along said chain brackets secured on said connecting plates;

notches formed over front and rear walls of said brackets for supporting the square center areas of the razors;

a fixed horizontal member lying downstream in the plane of advance of the razors;

two elements located above said second side member and having curvatures adapted to hold said razors rigid with the brackets in an open configuration;

a magazine for stacked blades;

a chest below said magazine;

means to horizontally drive said chest from a pick up position underlying said stacked blades to a discharge position overlying said chain;

a slider having suction and blowing means;

means to move said slider vertically at said discharge position of said chest;

said slider being adapted to be lowered onto said chest to pick up by suction a blade therefrom and to be then further lowered, with said chest in the withdrawn position, to deposit said blade onto the blade holder strip of a razor; fixed contoured detents effective to produce, as said brackets are being advanced, folding of said blade covering strip around said tabs onto said blade holder strip;

a fastener assembly located successively to said fixed detents and including a heater headpiece supported for vertical movement and adapted to spread the free end of said pegs apart for securing said blade between said blade holder strip and said blade covering strip.

2. A machine as claimed in claim 1, wherein said blade magazine is located on one side and at the top of said transport chain.

3. A machine as claimed in claim 1, wherein said fastener assembly is controlled by blade sensors on the respective strip of each individual razor.

4. A machine as claimed in claim 1, wherein successively to said fastener assembly, there are arranged on the sides of the chain, rigid with the machine, two fixed detents having a substantially helix-like shape and being adapted to cause folding onto the middle area of the razor of the strips and blade and hence of the end area of the razor.

5. A machine as claimed in claim 4, wherein successively to said fixed detents and above the chain path, there is provided for vertical movement a pad driven by a jack, which is adapted to clamp said razor end area against the middle area such as to rigidly lock said areas together for snap insertion of a peg of the end area into a middle area bushing.

* * * * *